United States Patent Office 2,774,707
Patented Dec. 18, 1956

2,774,707

TRITHIANYLIUM SULFENYL CHLORIDES

Gail H. Birum, Dayton, Ohio, assignor to Monsanto Chemical Company, St. Louis, Mo., a corporation of Delaware No Drawing. Application October 27, 1955,
Serial No. 543,265

19 Claims. (Cl. 167—33)

The present invention relates to organic sulfur compounds and more particularly provides new and valuable derivatives of trithiane, the method of preparing the same, and biological toxicants comprising said derivatives.

According to the invention there are prepared addition products in which one mole of trithiane is combined with from 1 to 3 moles of a sulfenyl chloride of the formula RSCl in which R is selected from the class consisting of hydrocarbon radicals of from 1 to 8 carbon atoms which are free of non-benzenoid unsaturation and which contain at least one substituent selected from the class consisting of halogen and the nitro radical. Examples of presently useful halogen-substituted hydrocarbon sulfenyl halides are 2-, 3- or 4-chlorobenzenesulfenyl chloride, 2,3-, 3,4- or 2,4-dibromobenzenesulfenyl chloride, 2-, 3- or 4-fluorobenzenesulfenyl chloride, 2-, 3- or 4-iodobenzenesulfenyl chloride, pentachlorobenzenesulfenyl chloride, 2-chloro-4-ethylbenzenesulfenyl chloride, trichloro-o-xylenesulfenyl chloride, 3-chloro-4-n-propylbenzenesulfenyl chloride, perchloromethyl mercaptan, dichloromethanesulfenyl chloride, 2-chlorocyclohexanesulfenyl chloride, 2-iodoethanesulfenyl chloride, 2-chloroethanesulfenyl chloride, etc. Examples of useful nitro-substituted hydrocarbon sulfenyl chlorides are 2-, 3- or 4-nitrobenzenesulfenyl chloride, 2-nitro-4-methylbenzenesulfenyl chloride, 2,4-dinitro - 3 - ethylbenzenesulfenyl chloride, 2-nitro-3,4-diethylbenzenesulfenyl chloride, 2-nitropropanesulfenyl chloride, etc. Examples of presently useful hydrocarbon sulfenyl halides having both nitro and halogen substituents are 4-chloro-2-nitrobenzenesulfenyl chloride and (2 - chloro - 4 - nitrophenyl) methanesulfenyl chloride.

Addition of the trithiane to the sulfenyl halides takes place by simply mixing the two reactants at ordinary, decreased or increased temperatures, and allowing the resulting mixture to stand until the addition reaction is complete. This can be ascertained by noting cessation in change of refractive index, disappearance of solid trithiane, decoloration of sulfenyl chloride, etc. When employing some of the very reactive sulfenyl halides, for example, chloromethanesulfenyl chloride, the trithiane is contacted with the sulfenyl halide gradually, and, advantageously, with external cooling. When the initial exothermal reaction has subsided, the reaction mixture may be allowed to stand at room temperature in order to assure completion of the reaction, or the reaction time may be shortened by heating the mixture. The vigorous exothermic reaction which is typical of the very reactive sulfenyl halides can also be moderated by employing an inert diluent or solvent. A solvent is also advantageously employed when operating with the solid aromatic sulfenyl halides. As examples of presently useful diluents or solvents may be mentioned liquid hydrocarbons such as benzene, toluene, hexane or kerosene; the chlorinated hydrocarbons such as carbon tetrachloride or tetrachloroethane; ethers such as ethyl ether or dioxane, etc.

As indicated above, the extent of heating depends upon the nature of the individual sulfenyl halide employed. Generally, there may be used temperatures of slightly above room temperature, i. e., of about 35° C., to about 150° C., or to the refluxing temperature of the reaction mixture if a diluent or solvent is employed. Superatmospheric pressures may be used generally and particularly when it is desired to accelerate the addition reaction of the more slowly reacting chloro- and/or nitro-substituted aromatic sulfenyl halides. A catalyst may or may not be employed.

While I do not know the reaction mechanism by which the present sulfenyl halide-trithiane adducts are formed, that addition rather than condensation products are obtained is evident from the elemental analysis of the products as well as by the fact that hydrogen halide is not evolved during the reaction in a quantity necessary to permit production of a condensation rather than an addition product. It may be that the trithiane nucleus is cleaved during the reaction with the addition of the sulfenyl halide to the cleaved fragment. Depending upon the reaction conditions employed, as well as upon the quantity of the sulfenyl halide which is available in the initial reaction mixture, from 1 to 3 moles of the sulfenyl halide combines with the trithiane. Generally, the reaction results in the formation of a mixture of a 1:1, 2:1 and 3:1 sulfenyl halide-trithiane adducts. Thus an addition product consisting of equal quantities of the 1:1 adduct and the 2:1 adduct may be characterized as an addition product in which one mole of trithiane is combined with an average of 1.5 moles of the sulfenyl halide.

The present chloro- and/or nitro-substituted sulfenyl halide-trithiane adducts are stable, rather high-boiling materials which are particularly valuable as biological toxicants, e. g., as insecticides, fungicides and herbicides. Since the present adducts are effective biological toxicants when employed in very small concentrations, commercial toxicants comprising the adduct may contain only minor proportions thereof. When they are to be employed as herbicides, oil-in-water emulsions containing the adducts in concentrations of from 0.1% to 2.0% by weight of the total weight of the emulsion are useful. The word "oil" is here used to designate any organic liquid which is insoluble in water. Emulsifying agents which may be employed are those used in the art for the preparation of oil-in-water emulsions. Examples of emulsifying agents which may be used include long-chained alkylbenzenesulfonates, polyalkylene glycols, long-chained alkyl sulfosuccinates, etc. For use as insecticides or fungicides, the present substituted sulfenyl halide-trithiane adducts are also very advantageously applied in oil-in-water emulsions. However, for these and related biological toxicant purposes, the adducts may be incorporated into inert carriers generally. Thus, they may be mixed with solid carriers such as clay, talc, pumice and bentonite, to give toxicant compositions which may be applied as dusts. I have found, however, that the emulsions possess an improved tendency to adhere to treated surfaces so that less of the active ingredients, i. e., the adduct, is required when applied in the emulsion form.

The invention is further illustrated, but not limited, by the following examples:

*Example 1*

Into a 500 ml., 3-neck flask equipped with a stirrer, dropping funnel and a calcium chloride-protected condenser there was placed 27.7 g. (0.2 mole) of trithiane and then during a time of about 10 minutes and at room temperature there was added to the trithiane 75 g. (0.4 mole) of perchloromethyl mercaptan (trichloromethanesulfenyl chloride). After heating the whole to about 50° C. the trithiane went into solution, and heating at 55°–60° C. was continued for two hours, during which time there was no indication of hydrogen chloride evolution. The weight of the reaction mixture at this point was 101.7 g. Distillation of this reaction mixture gave 30.3 g. of perchloromethyl mercaptan (boiling up to 27° C./0.3 mm.), and continued heating to remove material boiling below 110° C./0.3 mm. gave as residue 67.7 g. of the viscous trithianeperchloromethyl mercaptan adduct $n_D^{25}$ 1.6315, $d_4^{20}$ 1.619, analyzing 32.30% sulfur and 46.97% chlorine.

*Example 2*

Employing the reaction equipment described in Example 1, a mixture of 27 g. (0.2 mole) of trithiane and 112 g. (0.6 mole) of perchloromethyl mercaptan was brought to a temperature of 130° C. within a period of 2.5 hours, and was then maintained at 130°–135° C. for an additional one hour. Distillation of the resulting reaction mixture from a Claisen flask gave I: 60.7 g. of material boiling up to 40° C./0.3 mm., and II, a fraction, B. P. 40° C./0.3 mm. to 163° C./0.7 mm. Distillation of II to remove material boiling up to 57° C./0.3 mm. (pot temperature 95° C./0.3 mm.) gave as residue 63 g. of the clear, yellow, viscous trithiane-perchloromethyl mercaptan adduct, $n_D^{25}$ 1.6242, $d_4^{20}$ 1.687, and analyzing 33.13% S and 53.91% Cl. Fractionation of I gave 46.5 g. of recovered perchloromethyl mercaptan. The present adduct is thus one in which one mole of the trithiane is combined with an average of 1.65 moles of perchloromethyl mercaptan.

*Example 3*

A mixture consisting of 69.1 g. (0.5 mole) of trithiane and 186 g. (1.0 mole) of perchloromethyl mercaptan was brought to a temperature of 130° C. in 3.5 hours and maintained at 130°–135° C. for 4.5 hours. The whole was then allowed to stand at room temperature for about 24 hours and then distilled in vacuo to give I, 95 g., B. P. up to 69° C./1 mm., and as residue, II, 149 g. of the viscous trithiane-perchloromethyl mercaptan adduct, $n_D^{25}$ 1.6352, analyzing 35.71% sulfur and 52.29% chlorine.

*Example 4*

This example describes the reaction of trithiane with chloromethylsulfenyl chloride, ClCH₂SCl.

The chloromethylsulfenyl chloride was prepared by adding 135 g. (1.0 mole) of sulfuryl chloride during 20 minutes to 96 g. (1.0 mole) of methyl disulfide at a temperature of from minus 30° C. to minus 40° C., slowly allowing the temperature of the reaction mixture to rise to 1° C., adding an additional 270 g. (2.0 mole) portion of sulfuryl chloride to the resulting reaction mixture during a time of 0.8 hour at a temperature of from minus 2° C. to 1° C., then bringing the temperature of the reaction mixture to 10° C. in about 2 hours during which time considerable quantities of sulfur dioxide and hydrogen chloride were evolved, and finally allowing the reaction mixture to attain room temperature by standing overnight.

The whole reaction mixture consisting essentially of chloromethylsulfenyl chloride, was then warmed to 30° C. and 46 g. (0.33 mole) of trithiane was added thereto portionwise during 0.2 hour, employing external cooling in order to maintain the temperature at from 25° C. to 30° C. The resulting mixture was then heated to 112° C. in 1.5 hours. Distillation of the resulting reaction product to remove material boiling below 91° C./3 mm. gave as residue 86.5 g. of the viscous chloromethylsulfenyl chloride-trithiane adduct.

*Example 5*

This example describes the reaction of trithiane with 4-chlorobenzenesulfenyl chloride.

Into a 500 ml., 4-neck flask equipped with stirrer, thermometer, dropping funnel and condenser there was placed 20.7 g. (0.15 mole) of trithiane and 150 ml. of benzene and to the resulting mixture there was added during about 12 minutes 53.7 g. (0.30 mole) of 4-chlorobenzenesulfenyl chloride. The whole was then heated to reflux and refluxing was continued for 1.5 hours. Concentration of the resulting reaction mixture to a pot temperature of 90° C./0.1 mm. gave 72 g. of the red, liquid 4-chlorobenzenesulfenyl chloride-trithiane condensate, $n_D^{25}$ 1.6591, analyzing 37.55% C, 3.03% H and 24.96% Cl.

*Example 6*

Employing the apparatus described in Example 5, a mixture consisting of 20.7 g. (0.15 mole) of trithiane, 57.0 g. (0.3 mole) of 2-nitrobenzenesulfenyl chloride and 200 ml. of benzene was refluxed for 4.5 hours. Benzene was then distilled from the reaction mixture and refluxing was continued at 106° C. for 2.5 hours. Concentration of the resulting reaction mixture to a pot temperature of 85° C./12 mm. gave as residue 77.3 g. of the viscous, yellow 2-nitrobenzenesulfenyl chloride-trithiane adduct.

*Example 7*

This example describes the reaction of trithiane with 4-chlorobenzenesulfenyl chloride to form a 1:3 adduct.

Into a 500 ml., 4-neck flask equipped with stirrer, thermometer, dropping funnel and condenser there were placed 27.6 g. (0.2 mole) of trithiane, 150 ml. of toluene, and 107.4 g. (0.6 mole) of 4-chlorobenzenesulfenyl chloride. The mixture was then heated to 105°–120° C. and held at this temperature for 2.5 hours. On vacuum distillation, only about 7.0 g. of distillate were obtained up to 81° C./0.1 mm. (pot temperature, 120° C.); the residue consisted of 119.2 g. of the red, liquid 4-chlorobenzenesulfenyl chloride-trithiane adduct, analyzing 27.90% chlorine and 29.39% sulfur, which value shows addition of 1 mole of trithiane with 3 moles of the chlorobenzenesulfenyl chloride.

*Example 8*

Herbicidal evaluation of the trithiane-perchloromethyl mercaptan adduct prepared in Example 2 was conducted as follows:

A cyclohexanone solution of the adduct and an emulsifying agent were added to water, the quantity of solution employed being calculated to give emulsions containing 1.0% and 0.3% by weight, respectively, of the said adduct, based on the weight of the total emulsion. The quantity of emulsifying agent used was 0.2% by weight based on the weight of the total emulsion. Said emulsifying agent comprised a mixture of a polyalkylene glycol and an alkylbenzenesulfonate.

Three-week old corn and bean plants were sprayed with the respective emulsions, two plants of each variety being employed. The spraying was continued until droplets fell on and/or fell from the foliage and stems of the sprayed plants, up to 15 ml. of the emulsion being applied to each plant. The sprayed plants as well as two untreated "specimens" of each plant were then allowed to remain under standard conditions of sunlight and water for a period of one week. At the end of that time the sprayed plants were compared with the untreated plants in order to determine the extent of injury. Corn plants which had been sprayed with either the 1.0% or the 0.3% emulsion were completely dead and defoliated whereas bean plants which had been sprayed with either of these emulsions were severely injured and had dropped their leaves. Control plants, i. e., untreated plants, allowed to stand in the sunlight and water for the same length of time were in excellent condition as well as those which had been sprayed with a mixture of water and 10% by weight of cyclohexanone, the organic solvent employed above, and 0.2% by weight of the emulsifying agent employed above.

Example 9

This example shows testing of the perchloromethyl mercaptan-trithiane adduct of Example 2 as a bacteriostat. The testing was conducted as follows:

A 1% solution of the adduct in a nontoxic solvent was added to a nutrient agar to give a test sample containing one part of the test compound, i. e., the adduct, per 10,000 parts of the agar. Petri dishes were respectively filled with the test sample and the plates thus prepared were then inoculated with *Micrococcus pyogenes* var. *aureus* and with *Salmonella typhosa*. The inoculated dishes were incubated for a period of five days, at a temperature of 25° C. At the end of that time, inspection of the inoculated and incubated plates showed the growth of both the *pyogenes* and the *typhosa* organisms to be completely inhibited.

Example 10

This example shows evaluation of the fungicidal properties of the present adducts.

A 1% solution of the perchloromethyl mercaptan-trithiane adduct of Example 2 in a nontoxic solvent was added to sterile melted Sabouraud's dextrose agar in quantities to give respective concentrations of one part of the adduct per 1000 parts of the agar, and one part of the adduct per 10,000 parts of the agar. The resulting mixtures were then respectively poured into Petri dishes, allowed to harden, and inoculated with one drop each of a spore suspension of *Aspergillus niger*. They were then incubated for five days at a temperature of 25° C. Inspection of the inoculated and incubated plants at the end of this time showed complete inhibition of the *A. niger*, at both the 1:1000 and the 1:10,000 concentrations.

Example 11

Testing for insecticidal activity of the perchloromethyl mercaptan-trithiane adduct of Example 2 was conducted as follows:

The test chemical was dissolved in acetone to make 70.0 ml. of a 1% solution; and this was further diluted to make 50 ml. of 0.1% solution. Petri dishes were respectively sprayed in a Hoskins horizontal spray chamber by means of a modified Potter sprayer with 20 ml. of the respective solutions for 15 seconds at a pressure of 20 p. s. i. Two dishes were sprayed with each solution to provide duplicates. An additional period of 30 seconds was allowed for settling of the mist, and the open dishes were then held for 24 hours. At the end of this time, ten *Tribolium confusium* adults were placed in one set of the duplicate dishes and ten fourth instar large milkweed nymphs (*Oncopeltus fasciatus*) were placed in the other set of duplicate dishes. The dishes were then held uncovered at room temperature for 48 hours, at which time a 100% kill of both test insects at either the 1.0% or the 0.1% concentration of the adduct of Example 2 was noted.

Example 12

Testing of insecticidal activity of 2-nitrobenzenesulfenyl chloride-trithiane adduct of Example 6 was conducted as follows:

Foliage of potted bean plants which had been infested with the 2-spotted mite were dipped into an 0.2% aqueous dispersion of the adduct. Observation of the plants showed a 100% kill of the mites. Very good residual toxicity against the mites was noted at the end of seven days.

This is a continuation-in-part of my copending application, Serial No. 473,741, filed December 7, 1954.

What I claim is:

1. An adduct in which one mole of trithiane is combined with from 1 to 3 moles of a sulfenyl chloride of the formula RSCl in which R is selected from the class consisting of hydrocarbon radicals of from 1 to 8 carbon atoms which are free of non-benzenoid unsaturation and which contain at least one substituent selected from the class consisting of halogen and the nitro radical.

2. An adduct in which one mole of trithiane is combined with from 1 to 3 moles of a chlorine-substituted benzenesulfenyl chloride.

3. An adduct in which one mole of trithiane is combined with from 1 to 3 moles of a nitro-substituted benzenesulfenyl chloride.

4. An adduct in which one mole of trithiane is combined with from 1 to 3 moles of a chloro-substituted alkanesulfenyl chloride of from 1 to 8 carbon atoms in the alkane group.

5. An adduct in which one mole of trithiane is combined with from 1 to 3 moles of perchloromethyl mercaptan.

6. An adduct in which one mole of trithiane is combined with from 1 to 3 moles of chloromethylsulfenyl chloride.

7. An adduct in which one mole of trithiane is combined with from 1 to 3 moles of 4-chlorobenzenesulfenyl chloride.

8. An adduct in which one mole of trithiane is combined with from 1 to 3 moles of 2-nitrobenzenesulfenyl chloride.

9. The method which comprises contacting trithiane with a sulfenyl chloride of the formula RSCl in which R is selected from the class consisting of hydrocarbon radicals of from 1 to 8 carbon atoms which are free of non-benzenoid unsaturation and which contain at least one substituent selected from the class consisting of halogen and the nitro radical and recovering from the resulting reaction product an adduct in which one mole of the trithiane is combined with from 1 to 3 moles of said sulfenyl chloride.

10. The method which comprises contacting trithiane with a chloro-substituted benzenesulfenyl chloride and recovering from the resulting reaction product an adduct in which one mole of the trithiane is combined with from 1 to 3 moles of said sulfenyl chloride.

11. The method which comprises contacting trithiane with a nitro-substituted benzenesulfenyl chloride and recovering from the resulting reaction product and adduct in which one mole of the trithiane is combined with from 1 to 3 moles of said sulfenyl chloride.

12. The method which comprises contacting trithiane with a chloro-substituted alkanesulfenyl chloride of from 1 to 8 carbon atoms and recovering from the resulting reaction product an adduct in which one mole of the trithiane is combined with from 1 to 3 moles of said sulfenyl chloride.

13. The method which comprises contacting trithiane with perchloromethyl mercaptan and recovering from the resulting reaction product an adduct in which one mole of the trithiane is combined with from 1 to 3 moles of perchloromethyl mercaptan.

14. The method which comprises contacting trithiane with chloromethylsulfenyl chloride and recovering from the resulting reaction product an adduct in which one mole of the trithiane is combined with from 1 to 3 moles of said sulfenyl chloride.

15. The method which comprises contacting trithiane with 4-chlorobenzenesulfenyl chloride and recovering from the resulting reaction product an adduct in which one mole of the trithiane is combined with from 1 to 3 moles of said sulfenyl chloride.

16. The method which comprises contacting trithiane with 2-nitrobenzenesulfenyl chloride and recovering from the resulting reaction product an adduct in which one mole of the trithiane is combined with from 1 to 3 moles of said sulfenyl chloride.

17. A biological toxicant comprising an inert carrier and as the essential effective ingredient an adduct in which one mole of the trithiane is combined with from 1 to 3 moles of a sulfenyl chloride of the formula RSCl in which R is selected from the class consisting of hydrocarbon radicals of from 1 to 8 carbon atoms which are free of non-benzenoid unsaturation and which contain at least one substituent selected from the class consisting of halogen and the nitro radical.

18. The method of inhibiting the growth of living organisms which comprises exposing said organisms to a toxic quantity of an oil-in-water emulsion of an adduct in which one mole of the trithiane is combined with from 1 to 3 moles of a sulfenyl chloride of the formula RSCl in which R is selected from the class consisting of hydrocarbon radicals of from 1 to 8 carbon atoms which are free of non-benzenoid unsaturation and which contain at least one substituent selected from the class consisting of halogen and the nitro radical.

19. An insecticidal composition comprising an oil-in-water emulsion containing a toxic quantity of an adduct in which one mole of trithiane is combined with from 1 to 3 moles of perchloromethyl mercaptan.

References Cited in the file of this patent
UNITED STATES PATENTS 2,595,173  Schmidl _____ Apr. 29, 1952